May 31, 1932.  L. R. KRAUSE  1,860,617
DISH DRYING CABINET
Filed Oct. 10, 1930   2 Sheets-Sheet 1
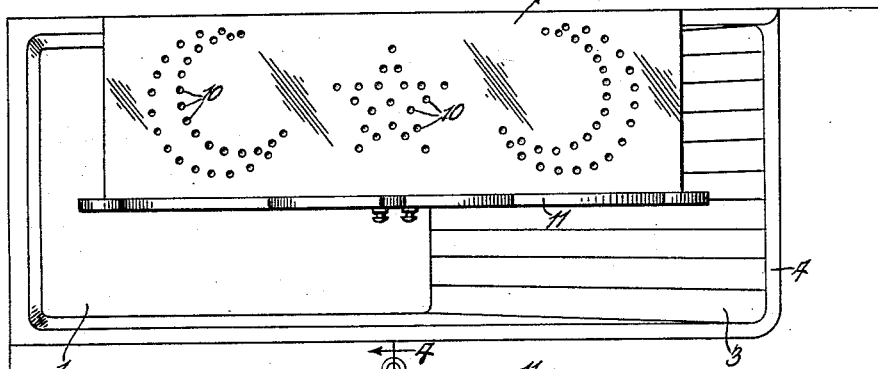
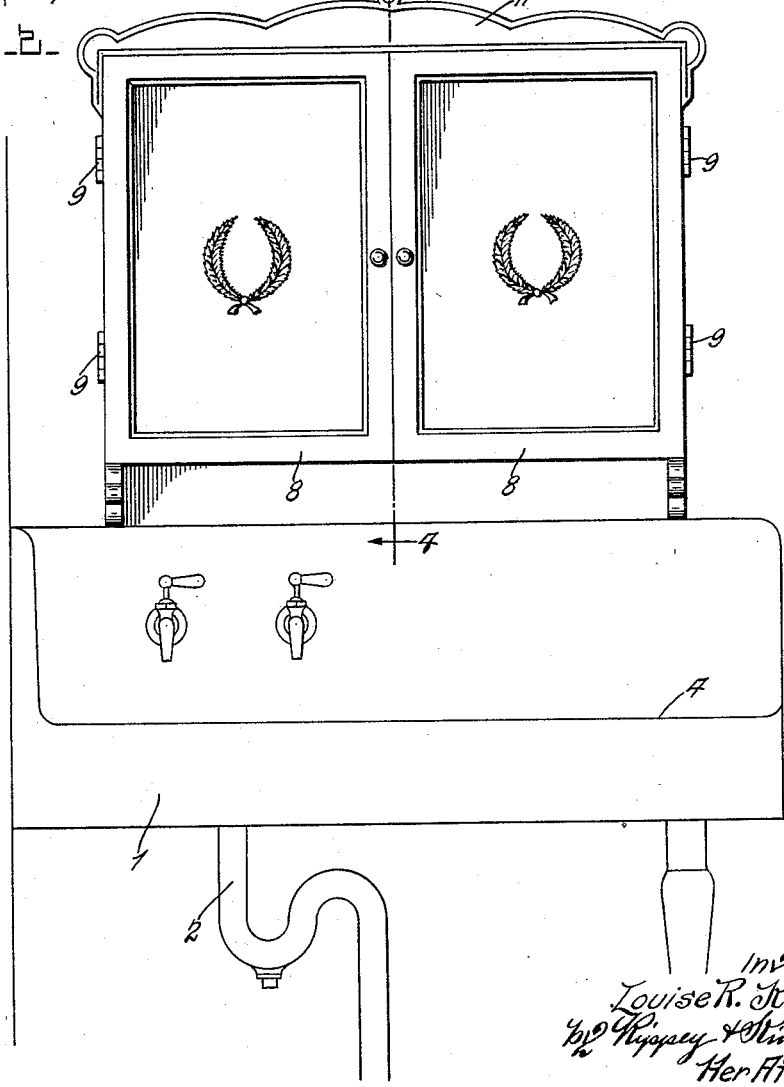
Inventor
Louise R. Krause
by Rypsey & Kingsland
Her Attorneys May 31, 1932.  L. R. KRAUSE  1,860,617
DISH DRYING CABINET
Filed Oct. 10, 1930  2 Sheets-Sheet 2
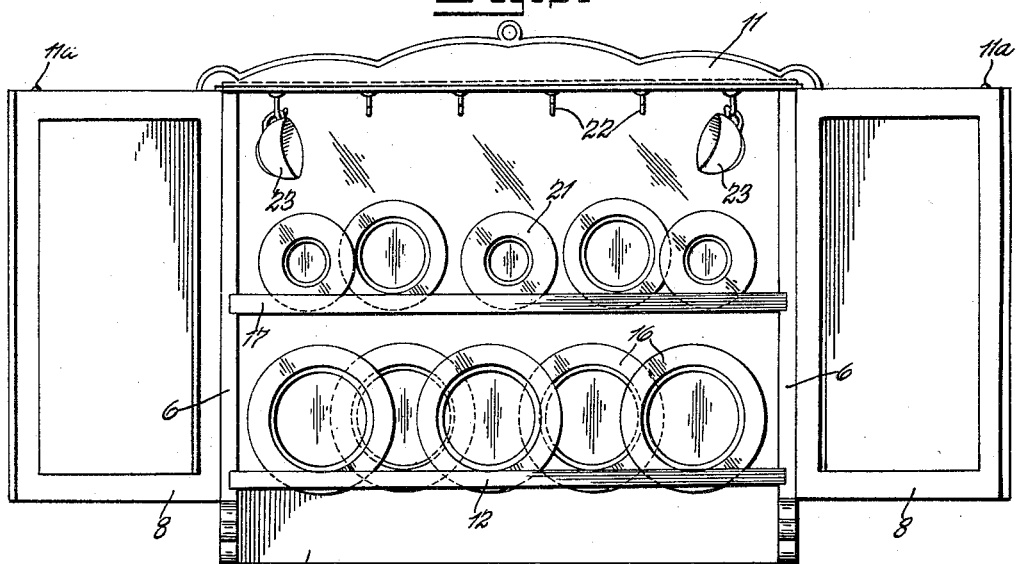
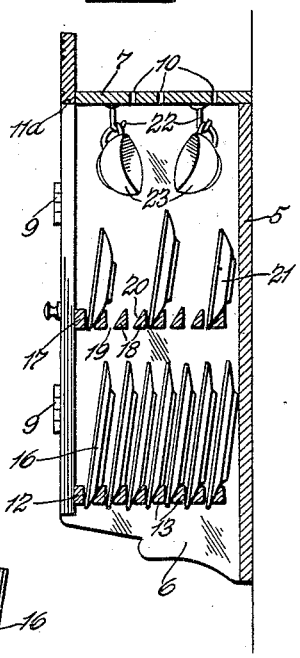
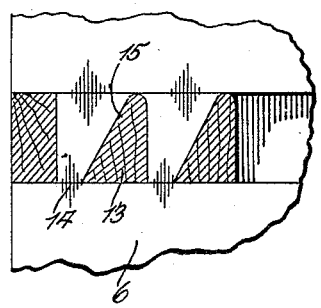
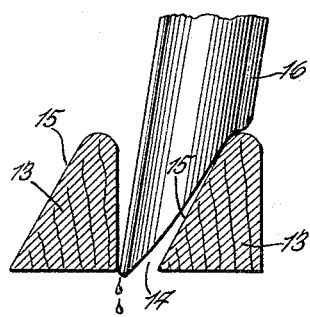
Inventor
Louise R. Krause
by Rippey & Kingsland
Her Attorneys Patented May 31, 1932

1,860,617

UNITED STATES PATENT OFFICE

LOUISE R. KRAUSE, OF ST. LOUIS, MISSOURI

DISH DRYING CABINET

Application filed October 10, 1930. Serial No. 487,673.

This invention relates to dish drying cabinets; and an object of the invention is to provide an improved cabinet comprising an enclosure arranged to receive and enclose dishes before the dishes are dried, in combination with means for supporting the dishes in the cabinet in spaced relationship so as to permit the water and moisture to drain and drop from the dishes and from the cabinet, and ventilating means permitting circulation of the air to the cabinet and the passage of moist vapors from the cabinet.

Another object of the invention is to provide an improved cabinet adapted to support dishes in a position in which the water and moisture may drain and drop from the dishes and which may also be satisfactorily used as a storage cabinet for chinaware and the like.

Another object of the invention is to provide a cabinet for the purpose mentioned having non-corrodible means therein for supporting the dishes in position in which the water and moisture may drain and drop from the open lower end of the cabinet. Thus, the dish supporting members may be made of wood, or they may be made of non-corrodible metal, this being unimportant so long as the other essential features of the invention are present.

Other objects will appear from the following description, reference being made to the accompanying drawings, in which Fig. 1 is a plan view of a cabinet constructed and arranged in accordance with the present invention.

Fig. 2 is a front elevation of the cabinet with the doors closed, a kitchen sink being shown to receive the water from the cabinet.

Fig. 3 is a front elevation of the cabinet with the doors open.

Fig. 4 is a vertical cross sectional view on the line 4—4 of Fig. 2.

Fig. 5 is an enlarged view showing the dish supporting rack members in section with a dish supported thereon in a relationship in which the water and moisture may drop from the dish.

Fig. 6 is a cross sectional view of the dish supporting racks in the cabinet.

A feature of the invention is the cooperative relationship of the cabinet with respect to a device for receiving and discharging the water that drops from the dishes enclosed in the cabinet. This feature of the invention is obtained by the location of the cabinet above a sink 1 from which a pipe 2 receives and conducts the water. The sink 1 is in the form of a receptacle that will receive and prevent the water from running on the floor of the room. A drain board 3 is bordered by a raised marginal portion 4 that prevents the water from running from the drain board onto the floor and causes the water to flow into the basin of the sink.

In the embodiment of the invention shown, the cabinet is an enclosure comprising a rear wall 5, end walls 6, a top wall 7 and a pair of doors 8 connected with the end walls 6 by hinges 9 so that said doors may be swung horizontally from closed to open positions and vice versa. The depth of this cabinet from front to rear is less than the width of the drain device with which it is combined, so that the drain device extends well to the front of the cabinet and does not interfere with the washing of the dishes in the sink 1 nor with the placement of the dishes on the drain 3. Further, the doors 8 are connected with the end walls 6 of the cabinet by the hinges 9 so that the doors may be swung laterally and extended in opposite directions beyond the end walls of the cabinet instead of being stopped in position in which the doors extend forwardly across the plane of the drain, which latter arrangement would interfere with the freedom of use of the drain device and constitute an inconvenience.

My improved cabinet includes ventilating means for permitting circulation of air through the cabinet, so that any vapors resulting from the placement of wet dishes in the cabinet may escape freely. As shown, the ventilating means comprises a series of holes 10 formed through the top wall of the cabinet of proper size and at proper intervals to permit the vapors to escape and prevent trapping of the vapors within the cabinet. An ornamental effect along the upper front of the cabinet is obtained by a façade 11 attached to the front edge of the top wall 7 and extending the full length of the cabinet and, if desired, across the upper corners of the cabinet, as shown in Fig. 2. The doors 8 may be equipped with known spring detent latches 11ᵃ for engagement with the lower edge of the panel 11 to hold the doors closed.

The horizontal bar 12 has its ends attached to the front edges of the cabinet end walls 6 and the front side of the bar 12 is flush with the front edges of said walls 6, so that when the front edges of the doors 8 are closed, the inner surfaces of said doors 8 seat against said bar 12. This bar 12 is located above the lower ends of the doors 8 and serves the double function of a door frame member and of a member for engaging the lower edges of dishes to support the dishes in approximately vertical positions in the cabinet.

A horizontal series of bars 13 have their ends attached to the end walls 6 of the cabinet and are in the same horizontal plane with the bar 12. These bars 13 are spaced apart so as to leave longitudinal spaces 14 between said bars, the bar 13 that is adjacent to the bar 12 being similarly spaced from said bar 12 and leaving a similar space 14 (Fig. 6). The front sides 15 of the bars 13 are inclined upwardly and rearwardly, so that the spaces 14 widen upwardly. A purpose of providing the inclined walls 15 is to permit the marginal portions of plates or dishes 16 to extend properly into the spaces 14, the edges of the plates or dishes 16 being slightly below the lower edges of the bars 13 so as to permit the water to flow freely from the dishes and drip into the drain device. This arrangement permits the dishes to be supported in approximately vertical or slightly inclined positions and leave openings between the lower edges of the dishes and the bars 13 and 12 which engage the front of the dishes. This arrangement also permits air to rise freely into the cabinet, even when the doors are closed, and to pass out through the venting devices 10 so as to discharge from the cabinet vapors resulting from the placement of wet dishes therein. The doors 8 extend downwardly a sufficient distance to conceal the lower edges of the dishes, so that, when the cabinet is closed, it is an ornamental device functioning as a storage cabinet and also as a drying cabinet for the dishes supported therein.

Above the bar 12, a similar horizontal bar 17 is attached to the end walls 6 of the cabinet in a relationship in which the front wall of said bar 17 is flush with the front edges of the walls 6, so that when the doors 8 are closed, the inner surfaces of said doors engage against said bar 17. This bar 17 is located above the dish supporting devices 12—13 a sufficient distance to provide a lower compartment, so that the dishes 16 may be freely racked in and removed from said lower compartment. Further, the bar 17 is located a sufficient distance below the top wall of the cabinet to provide an upper compartment for dishes. A horizontal series of bars 18 have their ends attached to the end walls 6 of the cabinet and are arranged in the same horizontal plane as the bar 17. These bars 18 are spaced from each other to provide spaces 19, similar to the spaces 14, and the front bar 18 is spaced from the bar 17 to provide a similar space. The front edges or walls 20 of the bars 18 are inclined upwardly and rearwardly, so that the spaces 19 widen upwardly as do the spaces 14. These bars 18 constitute supports for dishes 21, which may be racked on said bars in approximately vertical or slightly inclined positions, as shown in Fig. 4. With the lower edges of the dishes engaged in the spaces 19 and extending slightly below the bars 18, it permits any water carried by the dishes to drip therefrom without obstruction by said bars 18.

The cabinet may be equipped with means for supporting cups that are provided with handles, so that any water adhering to the cups may drain and drip therefrom and the cups become dry. As shown, a number of hooks 22 are attached to the under side of the top wall 7 of the cabinet, so that the handles of the cups 23 may be engaged on said hooks and thereby support the cups, so that any water adhering to the cups may drip therefrom and pass through the dish racks described and to the drain device.

This cabinet may be made of any appropriate material, such as wood or non-corrodible metal, or parts of the cabinet may be made of wood and other parts of metal. The invention may be otherwise varied within the scope of equivalent limits without departure from the nature and principle thereof. I do not restrict myself in any unessential respects, but what I claim and desire to secure by Letters Patent is:

1. In a drying cabinet having end walls, a horizontal bar attached to the front edges of said end walls, a series of horizontal bars attached to said end walls in the same horizontal plane with said first bar and being spaced from each other and said first bar and having their front edges inclined upwardly and rearwardly, the adjacent edges of said bars being adapted to engage the lower edges of dishes and support said dishes in approximately vertical positions, and doors hinged to said end walls and having their lower ends extended below said first named bar and adapted to engage therewith.

2. In a drying cabinet having end walls and a rear wall, a horizontal element attached to the front edges of said end walls, a series of horizontal bars extending approximately parallel with said rear wall and with said horizontal element and having their ends attached to said end walls and being spaced horizontally from each other and having their front edges inclined upwardly and rearwardly, the adjacent edges of said bars being adapted to engage the lower edges of dishes and support said dishes in approximately vertical positions, and doors hinged to said end walls and having their lower ends extending below said horizontal element and adapted to engage therewith when said doors are closed.

3. In a drying cabinet having end walls and a back wall attached thereto and a top wall having openings therethrough and said walls forming an enclosure having an open bottom; a number of vertically spaced horizontal bars attached to the front edges of said end walls parallel with said rear wall, a series of horizontal bars parallel with said rear wall and with said first named bars having their ends attached to said end walls and being spaced horizontally from each other and having their front edges inclined upwardly and rearwardly, the adjacent edges of said bars being adapted to engage the lower edges of dishes and support said dishes in approximately vertical positions, and a door hinged to one of said end walls and extending across and engaging said first named bars when said door is in closed position.

LOUISE R. KRAUSE.